(12) United States Patent
Blachowicz et al.

(10) Patent No.: US 8,844,804 B2
(45) Date of Patent: Sep. 30, 2014

(54) PROCESS OF AND SYSTEM FOR FACILITATING CASH COLLECTIONS DEPOSITS AND DEPOSIT TRACKING

(75) Inventors: Paul Blachowicz, Lantana, TX (US); Aaron Baker, Plano, TX (US); Frederick Purches, Coppell, TX (US)

(73) Assignee: Brink's Network, Inc., Richmond, VA (US)

( * ) Notice: Subject to any disclaimer, the term of this patent is extended or adjusted under 35 U.S.C. 154(b) by 1093 days.

(21) Appl. No.: 12/178,109

(22) Filed: Jul. 23, 2008

(65) Prior Publication Data

US 2009/0032580 A1 Feb. 5, 2009
US 2011/0031306 A2 Feb. 10, 2011

Related U.S. Application Data

(60) Provisional application No. 60/953,557, filed on Aug. 2, 2007.

(51) Int. Cl.
  *G06Q 40/00* (2012.01)
  *G07G 1/12* (2006.01)
  *G06Q 20/10* (2012.01)
  *G06Q 40/02* (2012.01)

(52) U.S. Cl.
  CPC .................. *G07G 1/12* (2013.01); *G06Q 20/10* (2013.01); *G06Q 40/02* (2013.01)
  USPC ................. 235/379; 235/375; 705/39; 705/45

(58) Field of Classification Search
  USPC ............ 235/375, 379, 419, 425, 462.01, 487, 235/492
  See application file for complete search history.

(56) References Cited

U.S. PATENT DOCUMENTS 3,852,571 A 12/1974 Hall et al.
3,998,155 A 12/1976 Cothran et al.
(Continued)

FOREIGN PATENT DOCUMENTS

CA 2510812 12/2005
EP 0455200 A2 11/1991
(Continued)

OTHER PUBLICATIONS

PCT—International Search Report, dated Sep. 19, 2008, in PCT/US2008/071052 (3 pages).
(Continued)

*Primary Examiner* — Paultep Savusdiphol
(74) *Attorney, Agent, or Firm* — Cowan, Liebowitz & Latman, P.C.; Mark Montague

(57) ABSTRACT

A process of facilitating cash collection deposits and deposit tracking includes identifying by a retailer an amount of cash collected by that retailer, including respective amounts of currency by denomination of the collected cash, creating a deposit ticket containing at least a unique identification code associated therewith, depositing the created deposit ticket and the collected cash into a deposit bag, transporting the deposit bag to a cash processing facility, and counting at the cash processing facility the collected cash contained in the transported deposit bag to verify that the amount previously identified by the retailer corresponds to the counted amount. Particularly additional novel features include at least the following: the manner in which the retailer identifies the amount of collected cash; the manner in which the deposit bag may be scheduled for pickup; providing advance credit to the retailer for the cash deposits during various stages of cash handling/processing; and the particular manner of tracking the status of each of the deposit bags of a retailer's multiple stores.

35 Claims, 8 Drawing Sheets

(56) References Cited

U.S. PATENT DOCUMENTS

| | | | |
|---|---|---|---|
| 4,084,520 A | 4/1978 | Frier | |
| 4,314,352 A | 2/1982 | Fought | |
| 4,674,060 A | 6/1987 | Larkin et al. | |
| 5,025,372 A | 6/1991 | Burton et al. | |
| 5,051,900 A | 9/1991 | Ito et al. | |
| 5,117,355 A | 5/1992 | McCarthy | |
| 5,252,811 A | 10/1993 | Henochowicz et al. | |
| 5,265,007 A | 11/1993 | Barnhard, Jr. et al. | |
| 5,326,960 A | 7/1994 | Tannenbaum | |
| 5,564,546 A | 10/1996 | Molbak et al. | |
| 5,583,759 A | 12/1996 | Geer | |
| 5,620,079 A | 4/1997 | Molbak | |
| 5,630,073 A | 5/1997 | Nolan | |
| 5,668,897 A | 9/1997 | Stolfo | |
| 5,695,038 A * | 12/1997 | Keith et al. | 194/206 |
| 5,704,491 A | 1/1998 | Graves | |
| 5,717,868 A | 2/1998 | James | |
| 5,774,663 A | 6/1998 | Randle et al. | |
| 5,787,403 A | 7/1998 | Randle | |
| 5,899,982 A | 5/1999 | Randle | |
| 5,910,988 A | 6/1999 | Ballard | |
| 5,930,788 A | 7/1999 | Wical | |
| 5,944,163 A * | 8/1999 | Keith et al. | 194/206 |
| 5,950,179 A | 9/1999 | Buchanan et al. | |
| 5,963,647 A | 10/1999 | Downing et al. | |
| 5,974,146 A | 10/1999 | Randle et al. | |
| 5,975,275 A * | 11/1999 | Keith et al. | 194/217 |
| 6,032,137 A | 2/2000 | Ballard | |
| 6,067,530 A * | 5/2000 | Brooks et al. | 705/30 |
| 6,105,007 A | 8/2000 | Norris | |
| 6,105,009 A | 8/2000 | Cuervo | |
| 6,119,106 A | 9/2000 | Mersky et al. | |
| 6,182,052 B1 | 1/2001 | Fulton et al. | |
| 6,202,054 B1 | 3/2001 | Lawlor et al. | |
| 6,328,208 B1 | 12/2001 | Artino et al. | |
| 6,341,272 B1 | 1/2002 | Randle | |
| 6,405,182 B1 | 6/2002 | Cuervo | |
| 6,523,742 B1 | 2/2003 | Awatsu et al. | |
| 6,594,647 B1 | 7/2003 | Randle et al. | |
| 6,626,357 B1 | 9/2003 | Ross | |
| 6,659,340 B2 | 12/2003 | Siemens | |
| 6,885,281 B2 | 4/2005 | McGunn et al. | |
| 6,896,177 B2 | 5/2005 | Carter | |
| 7,063,252 B2 | 6/2006 | Smith et al. | |
| 7,070,093 B2 | 7/2006 | Siemens et al. | |
| 7,111,754 B1 | 9/2006 | Siemens | |
| 7,113,929 B1 | 9/2006 | Beach et al. | |
| 7,143,933 B2 | 12/2006 | Uematsu et al. | |
| 7,191,151 B1 | 3/2007 | Nosek | |
| 7,216,098 B1 * | 5/2007 | Brooks et al. | 705/30 |
| 7,472,826 B2 | 1/2009 | Vallance | |
| 7,520,421 B2 * | 4/2009 | Salafia et al. | 235/379 |
| 7,610,215 B1 | 10/2009 | Folk et al. | |
| 7,635,085 B2 * | 12/2009 | Brown et al. | 235/379 |
| 2001/0054643 A1 | 12/2001 | Siemens | |
| 2002/0011393 A1 | 1/2002 | Siemens | |
| 2002/0063034 A1 * | 5/2002 | Dobbins | 194/302 |
| 2002/0087468 A1 | 7/2002 | Ganesan et al. | |
| 2002/0091637 A1 | 7/2002 | Bent et al. | |
| 2002/0100399 A1 * | 8/2002 | Young | 109/24.1 |
| 2002/0145035 A1 | 10/2002 | Jones | |
| 2003/0080185 A1 | 5/2003 | Werther | |
| 2003/0105709 A1 | 6/2003 | Orlando | |
| 2003/0116622 A1 | 6/2003 | Suttie et al. | |
| 2003/0191722 A1 | 10/2003 | Thompson et al. | |
| 2003/0208438 A1 | 11/2003 | Rothman | |
| 2003/0208439 A1 | 11/2003 | Rast | |
| 2004/0139000 A1 | 7/2004 | Amos | |
| 2004/0148254 A1 | 7/2004 | Hauser | |
| 2004/0193537 A1 | 9/2004 | Knapp | |
| 2004/0210515 A1 * | 10/2004 | Hughes | 705/39 |
| 2004/0226493 A1 | 11/2004 | Siemens et al. | |
| 2004/0267673 A1 | 12/2004 | Ballard et al. | |
| 2005/0096986 A1 | 5/2005 | Taylor et al. | |
| 2005/0108164 A1 * | 5/2005 | Salafia et al. | 705/42 |
| 2005/0228733 A1 | 10/2005 | Bent et al. | |
| 2006/0036537 A1 | 2/2006 | Lawrence et al. | |
| 2006/0106716 A1 * | 5/2006 | Hurwitz et al. | 705/40 |
| 2006/0253332 A1 | 11/2006 | Dobbins | |
| 2006/0253349 A1 * | 11/2006 | Brooks et al. | 705/30 |
| 2007/0108267 A1 | 5/2007 | Jonsson et al. | |
| 2007/0130063 A1 | 6/2007 | Jundia et al. | |
| 2007/0194102 A1 | 8/2007 | Cohen et al. | |
| 2008/0120232 A1 * | 5/2008 | Herrin et al. | 705/42 |
| 2008/0123932 A1 | 5/2008 | John et al. | |
| 2009/0006249 A1 | 1/2009 | Morgan et al. | |
| 2009/0018959 A1 | 1/2009 | Doran et al. | |

FOREIGN PATENT DOCUMENTS

| | | |
|---|---|---|
| EP | 1445744 | 11/2004 |
| GB | 807880 | 1/1959 |
| GB | 2079846 A | 1/1982 |
| GB | 2130299 A | 5/1984 |
| GB | 2326671 A | 12/1998 |
| JP | 58195272 | 11/1983 |
| WO | 0111528 | 2/2001 |
| WO | 02093457 | 11/2002 |

OTHER PUBLICATIONS

Ferrari, Michael. Thinking Outside the Safe Box. Apr. 2007. Convenience Store Decisions. p. 34-35.

Brinks Webpage on Compusafe Service. Dec. 16, 2005. http://web.archive.org/web/20051216122333/http://www.us.brinksinc.com/high_tech_solutions/compusafe_overview.html.

Brinks Webpage on Logistics Solutions. Oct. 26, 2005. http://web.archive.org/web/20051026013157/http://www.brinksinc.com/solutions_and_services/index.html.

U.S. Patent Reference Nos. 5, 6 and 7 and U.S. Patent Application Nos. 4 and 5 were cited in U.S. Office Action dated Feb. 19, 2010, that issued in related U.S. Appl. No. 11/924,055.

Brink's Helps Retailers Turn Cash Receipts Into Investable Funds Faster, Oct. 20, 2008 www.pr-inside.com/print870847.htm.

References cited in Office action for related U.S. Appl. No. 12/437,216; Jun. 1, 2012.

* cited by examiner

FIG. 3B

Brinks Deposit - Microsoft Internet Explorer

File Edit View Favorites Tools Help

Back | Search Favorites

Address http://depositdemo.brinksinc.com/default.aspx

BRINKS

Create Deposit
Track Status
Reports

Legal Notice
and
Terms and Conditions

User: ChainMart 1001 Manage Password Logout

Create Deposit

ChainMart
Location: 1001                    Date Prepared: 2/20/2007

Amount

100 [        ]
50  [        ]
20  [        ]
10  [        ]
5   [        ]
2   [        ]
1   [        ]

Total Cash      0.00
Mixed Coin  [        ]
Total Deposit   0.00
Bag #       [        ]
Prepared by [        ]

[Enter Deposit]  [Cancel]

Done                                              Internet

FIG. 3C

Brinks Deposit - Microsoft Internet Explorer

File Edit View Favorites Tools Help

Address http://depositdemo.brinksinc.com/def/aut.aspx

BRINKS

User: ChainMart 1001  Manage Password  Logout

Create Deposit
Track Status
Reports

Legal Notice
and
Terms and Conditions iDeposit Confirm Screen

IDEPOSIT TICKET

ChainMart  Location: 1001
300 Dividend Ave, Sacramento, CA

Proposed by:
Bag #: 45
Date: 2/28/2007 1:34:30 PM

| Currency | Amount |
|---|---|
| 100 | 500.00 |
| 50 | 300.00 |
| 20 | 120.00 |
| 10 | 50.00 |
| 5 | 35.00 |
| 2 | 0.00 |
| 1 | 16.00 |
| TOTAL CASH | $1,021.00 |
| Mixed Coin | 0.00 |
| TOTAL | $1,021.00 |

[Confirm Deposit]  [Edit Ticket]

PROCESS OF AND SYSTEM FOR FACILITATING CASH COLLECTIONS DEPOSITS AND DEPOSIT TRACKING

REFERENCE TO RELATED APPLICATION

This application claims priority to U.S. Patent Application No. 60/953,557, filed Aug. 2, 2007, the disclosure of which is incorporated herein by reference.

FIELD OF THE INVENTION

The present invention relates to a process/system for facilitating novel cash collections deposits and deposit tracking. More particularly, the present invention relates to the process for handling and processing of the physical cash collected by retailers during transactions for goods and/or services, and the tracking thereof.

BACKGROUND OF THE INVENTION

With today's fast-paced mentality, individuals and businesses expect financial transactions and financial related processes to be carried out quickly, easily and ideally error-free. In order to achieve these objectives, companies and particularly retailers invest substantial amounts of money to purchase or lease specialized hardware and software, and spend additional monies to train personnel in the operation and use of such specialized hardware and software. In the retail industry, it is now commonplace for retailers to have within their various stores credit and debit card processing equipment so that credit and debit card transactions may be processed quickly both at the point of sale and in back office operations. However, and unlike credit and debit card transactions and post-transaction processing, cash transactions and post-cash transaction processing are relatively slow and prone to human error. More particularly, after cash is collected by a retailer, the manners in which the cash is handled, processed, counted, and ultimately deposited into a financial institute are relatively slow and cumbersome.

OBJECTS AND SUMMARY OF THE INVENTION

In view of the foregoing, it is a general object of the present invention to provide a process for handling and processing cash collections that entails improvements over currently existing processes.

It is a particular object of the present invention to provide a process for handling and processing cash collections that enables retailers to process the collected cash without the need for the retailer to purchase, lease, install or otherwise utilize specialized hardware or software.

It is another object of the present invention to provide retailers with improved cash collection processing that seeks to minimize human entry and potential error in post-transaction cash handling.

It is a further object of the present invention to provide retailers with accelerated funds accessibility.

To achieve the foregoing and other objects, the present invention entails a process for facilitating cash collection deposits, comprising the steps of identifying by a retailer an amount of cash collected by the retailer, the identified amount including respective amounts of currency by denomination of the collected cash, creating at the retailer a deposit ticket, the deposit ticket having a unique identification code associated therewith and the unique identification code is associated with the identified amount of collected cash, depositing the created deposit ticket and the collected cash into a deposit bag, transporting the deposit bag to a cash processing facility, ascertaining at the cash processing facility the identified amount of collected cash associated with the unique identification code associated with the deposit ticked contained in the transported deposit bag, counting, at the cash processing facility, the collected cash contained in the transported deposit bag to produce a counted amount of cash, and verifying that the ascertained identified amount of collected cash corresponds to the counted amount of collected cash. Thereafter, the counted cash is deposited into a financial institute.

As a particularly valuable aspect of the invention, the retailer enters into an electronic device the respective amounts of currency by denomination of the collected cash, and the electronic device transmits to the cash processing facility data that corresponds to the information entered into the electronic device.

As another aspect of the invention, the retailer enters the data into a webpage of the cash processing facility.

As a further aspect of the invention, the retailer identifies the number of bills of each collected currency (e.g., number of $100 bills, number of $50 bills, etc.).

As an additional aspect of the invention, the retailer prints the deposit ticket on a standard size piece of paper.

As yet another aspect of the invention, the retailer may communicate via a telephone the respective amounts of currency by denomination of the collected cash, rather than via a computer; and the deposit ticket is sent to the retailer via a facsimile communication.

As yet a further aspect of the invention, the deposit ticket includes a bar code representing the unique identification code.

As yet an additional aspect of the invention, the deposit ticket includes the respective amounts of currency by denomination of the collected cash.

Still as yet a further aspect of the invention, the deposit bag is a tamper-evident type bag.

As another aspect of the invention, the deposit bag includes an RFID chip that uniquely identifies the deposit bag.

As an additional aspect of the invention, a pickup of the deposit bag from the retailer is automatically scheduled upon creation of the deposit ticket.

As yet a further aspect of the invention, the retailer is provided with a credit that corresponds to the amount of the collected cash.

As a feature of this aspect, the credit is provided when the deposit ticket is created. Alternatively, the credit is provided after verifying that the ascertained identified amount of collected cash (i.e., the original amount identified by the retailer) corresponds to the counted amount of collected cash (i.e. the amount counted by the cash processing facility).

As another aspect of the invention, the process includes tracking the status of the deposit bag, where the status is a function of at least a location of the deposit bag and whether the verifying step has been carried out for the respective deposit bag.

In accordance with another embodiment of the present invention, a process of facilitating cash collection deposits comprises the steps of depositing cash collected by a retailer into an electronic safe disposed at the retailer, identifying by the electronic safe an amount of the collected cash, the identified amount including respective amounts of currency by denomination of the collected cash, creating at the retailer a deposit ticket, the deposit ticket having a unique identification code associated therewith and the unique identification code is associated with the identified amount of collected cash, depositing the created deposit ticket and the collected cash into a deposit bag, transporting to a cash processing facility the deposit bag containing the deposit ticket and the collected cash, ascertaining the identified amount of collected cash associated with the unique identification code associated with the deposit ticked contained in the transported deposit bag, counting, at the cash processing facility, the collected cash contained in the transported deposit bag to produce a counted amount of cash, and verifying that the ascertained identified amount of collected cash corresponds to the counted amount of collected cash.

As an aspect of this embodiment, the process further includes communicating from the electronic safe to the cash processing facility the amount of the collected cash; and accessing a predetermined webpage of the cash processing facility by the retailer using a computer disposed at the retailer and printing the deposit ticket in response to a print command on the computer while accessing the predetermined webpage. The deposit ticket is printed at the retailer.

In accordance with a further embodiment of the present invention, a process of facilitating cash collection deposits at a plurality of stores of a retailer, comprises the steps of identifying, at each of the stores of the retailer, by a manager at the respective store an amount of cash collected at the respective store, the identified amount including respective amounts of currency by denomination of the collected cash, creating, at each of the stores of the retailer, a deposit ticket having a unique identification code associated therewith and the unique identification code is associated with the identified amount of collected cash at the respective store, depositing, at each of the stores of the retailer, the created deposit ticket and the collected cash into a respective deposit bag, transporting each of the deposit bags to a cash processing facility, each of the deposit bags containing the respective deposit ticket and the respective collected cash, ascertaining, for each of the transported deposit bags, the respective identified amount of collected cash associated with the unique identification code associated with the respective deposit ticked contained in the respective transported deposit bag, counting, at the cash processing facility, the collected cash contained in each of the transported deposit bags to produce respective counted amounts of cash, and verifying that each of the ascertained identified amounts of collected cash correspond to the respective counted amount of collected cash.

As an aspect of this embodiment, a credit is provided to the retailer that corresponds to a total of all of the amounts of the collected cash of all of the stores of the retailer.

As another aspect of this embodiment, the process includes tracking the statuses of all of the deposit bags, where a status of a respective deposit bag is a function of at least a location of the deposit bag.

As another aspect, the status of each of the deposit bags includes identifying if a deposit ticket was created for the respective deposit bag but the respective deposit bag is still located at the respective store of the retailer.

As a further aspect, the status of each of the deposit bags also is a function of whether the verifying step has been carried out for the respective deposit bag.

As an additional aspect, a manager at each store accesses a predetermined webpage of the cash processing facility and identifies within the predetermined webpage the respective amounts of cash collected at the respective store. Each manager accesses the same predetermined webpage.

As a feature of this aspect, no specialized software is needed to be installed on the electronic devices that are utilized by the managers.

Various other objects, advantages and features of the present invention will become readily apparent to those of ordinary skill in the art from the following detailed description of the invention.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 3A through 3D are exemplary web page images that may be employed during the process of the present invention.

DETAILED DESCRIPTION OF THE PRESENT INVENTION

The present invention pertains to a process/system for facilitating novel cash collections deposits and deposit tracking. In general, the present invention takes the store-level cash collections process into the electronic age with real-time, web-based deposit creation and tracking, right from the store or office. The inventive process/system combines armored transportation with advanced information technology tools to create a cash management solution that increases efficiencies, expedites funds availability, improves cash flow and provides other features and benefits as herein described. As a particularly useful feature, as described further below, the present invention facilitates the supply of credit information to a financial institution on the same-day that armored car service is provided for cash pickup at a cash-accepting retail facility.

In accordance with the present invention, the general system/process entails multiple entities. As used herein, an entity generally is a company providing goods and/or services, such as a bank, an armored car service, a retail store (e.g., a department store, a grocery store), a transportation provider (e.g., an airline, a bus company), etc. For convenience, the generic term "retailer" is used herein to refer to a company that provides goods and/or services in exchange for money and where that retailer sometimes (perhaps often) accepts physical cash (paper currency and coin) in exchange for such goods and/or services. A retailer may be disposed at a single location or at multiple locations (e.g., sometimes referred to as a "chain"). As various examples only, a retailer may be a department store, a gas station, or a bus company, each of which may have one or more physical store locations.

Figure 1:
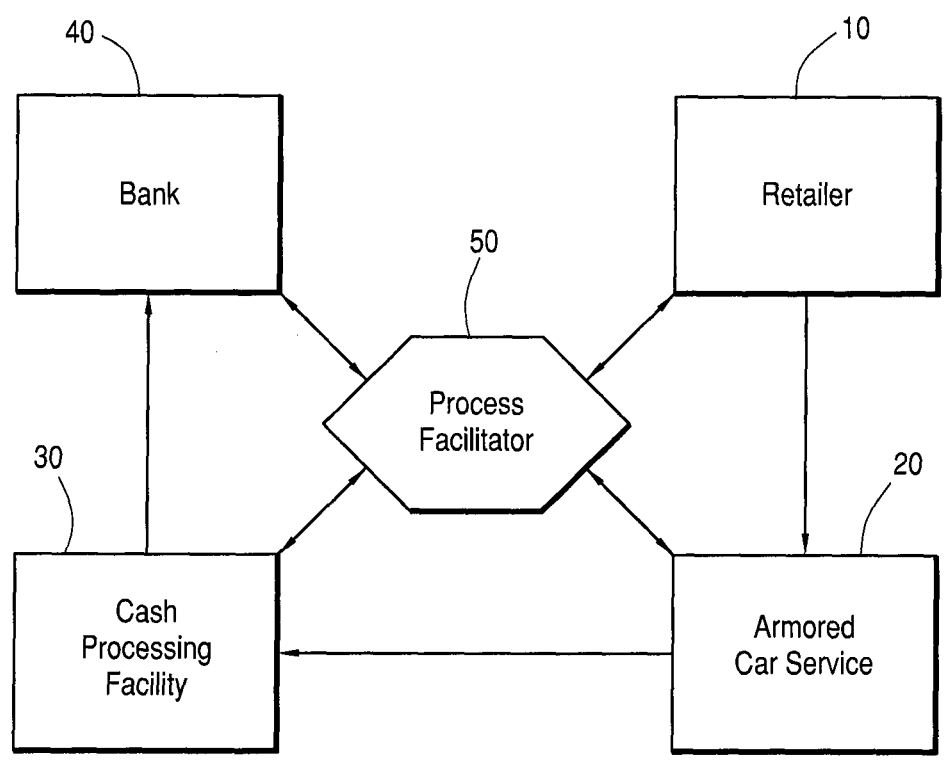
FIG. 1 is a block diagram that shows multiple entities that may be involved in the process of facilitating cash collection deposits and deposit tracking in accordance with the present invention.

Referring now to the drawings, FIG. 1 thereof is a block diagram that shows multiple entities that generally are involved in the cash collection deposit process of the present invention. The entities shown include retailer 10, armored car service provider 20, cash processing facility 30, bank 40, and process facilitator 50. Although five entities are shown, additional entities may also be involved to assist with one or more entities with its respective functions. Further, a single entity may carry out the functions of two or more entities and, thus, the total number of entities involved in the process may be less than the five entities shown in FIG. 1. In particular, each entity involved in the process is described herein in terms of the functions it carries out. For example, the functions of armored car service provider 20 and cash processing facility 30 may be carried out by a single entity. As another example, all of the functions of armored car service provider 20, cash processing facility 30 and process facilitator 50 may be carried out by a single entity. Other scenarios may be possible. In any event, the present invention entails multiple steps, substeps and functions carried out by one or more entities to provide certain advantageous features. For convenience, the present invention is described herein with reference to the different entities shown in FIG. 1.

Figure 2:
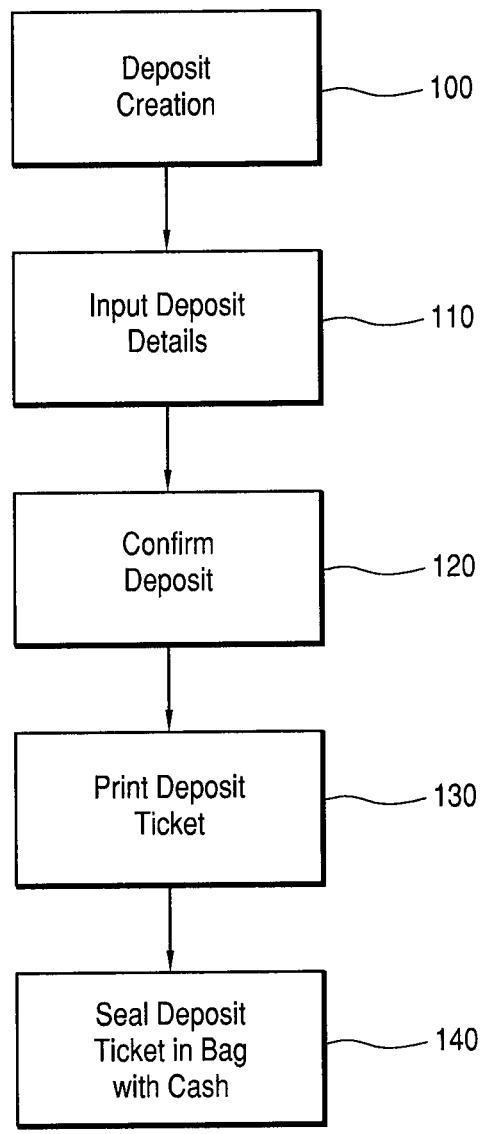
FIG. 2 is a schematic flow diagram that shows in general terms the process of facilitating cash collection deposits and deposit tracking in accordance with the present invention.

FIG. 2 of the drawings is a schematic flow diagram that shows in general terms the cash collection deposit process steps that are carried out by retailer 10. Generally, prior to commencement of the inventive process herein described, retailer 10 already has collected a certain amount of cash (generally in exchange for goods and/or services) and desires to have that cash deposited into its bank account (e.g., within bank 40) or be credited or transferred in some other way.

Figure 3A:
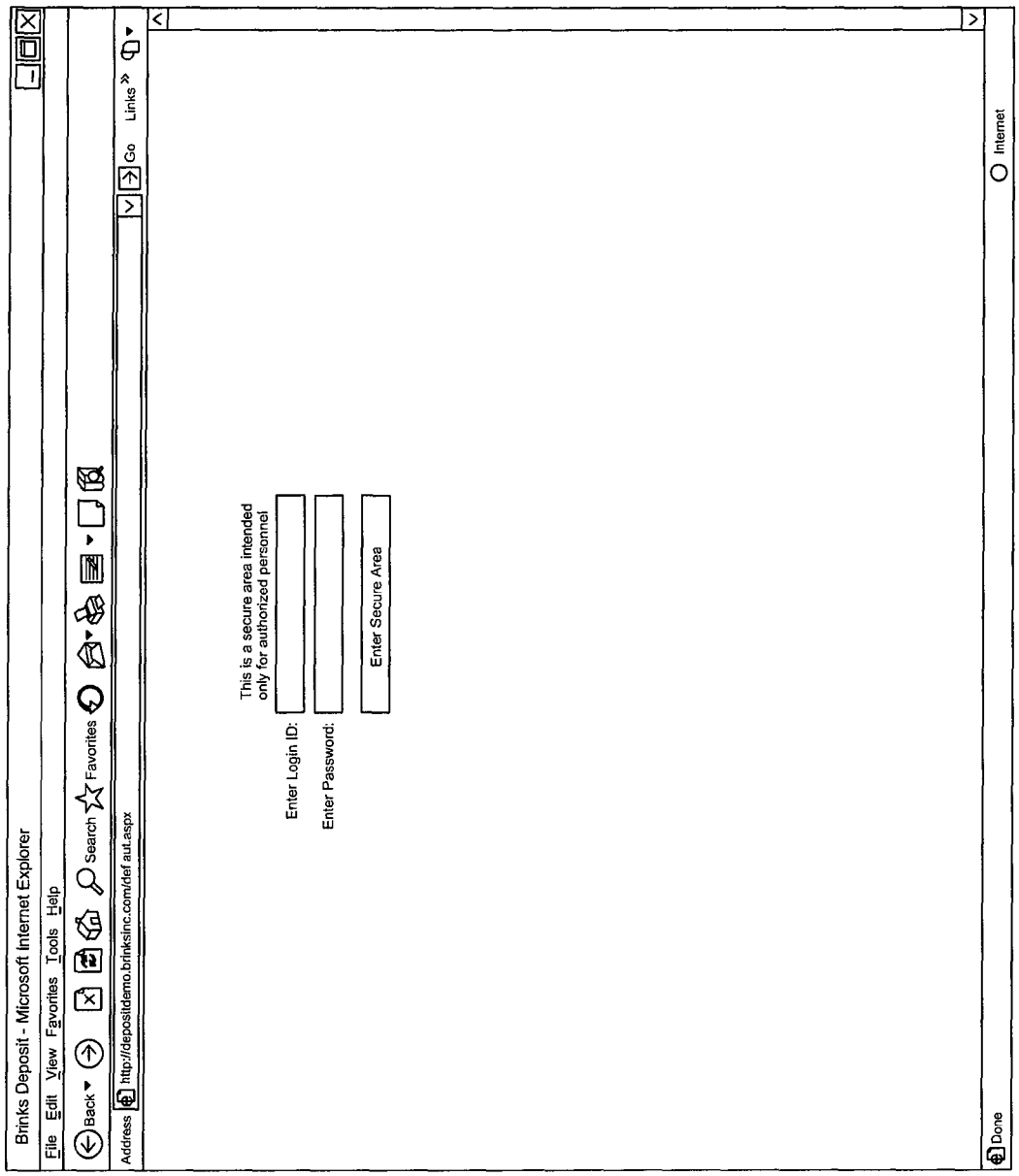

At a preset period of time or when a sufficient amount of cash is collected by the retailer or at another time generally selected by the retailer, a manager or other authorized employee or agent of the retailer initiates, as shown as step 100 in FIG. 2, the deposit transaction process of the present invention. For convenience, this person is referred to herein as the retailer's "manager." In the preferred embodiment of the present invention, deposit initiation (also referred to herein as "deposit creation") is carried out by the manager logging onto a secure website of process facilitator 50, and an exemplary log-in screen is shown in FIG. 3A. Preferably, each individual (e.g., manager) who is authorized to create a deposit is assigned a unique, respective User ID so that the identities of the deposit creators may be tracked. Upon entry of a recognized User ID and password, the manager selects "create deposit" or other similar command within the displayed webpage to proceed.

The manager inputs the deposit details, as shown as step 110 in FIG. 2. In accordance with the present invention, deposit details include deposit amounts by denomination, and an exemplary web-page into which such data may be entered is shown in FIG. 3B. In particular, the number of $100 bills, $50 bills, etc., to be deposited are entered within the webpage, and the web-page is suitably programmed to auto-calculate the total amount to be deposited based on the entered data. After the manager enters the deposit details, the entered information preferably is displayed to the manager for confirmation, as shown as step 120 in FIG. 2. An exemplary confirmation page is shown in FIG. 3C.

Figure 3D:
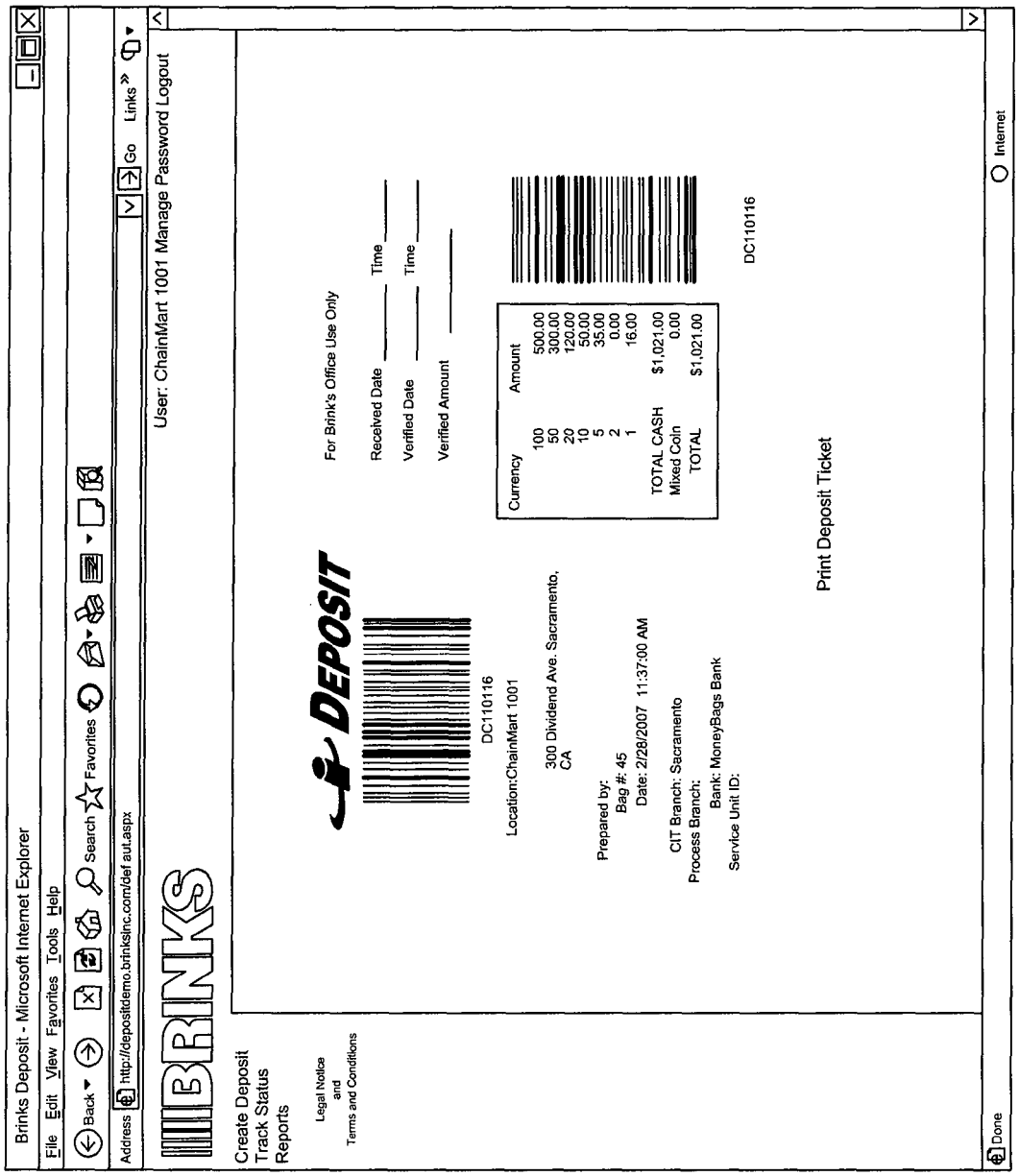

After the manager confirms that the entered information is correct, a deposit ticket to be printed is displayed to the manager, as shown in the exemplary screen shot shown in FIG. 3D. The manager prints the displayed deposit ticket using a printer attached to the computer or through a network, as shown as step 130 in FIG. 2. The deposit ticket contains certain information, including the amount of each currency denomination, the total amount of cash to be deposited, the retailer identification, a bar-code that uniquely identifies the deposit and other useful information. Preferably, the deposit ticket is printed on standard letter-size paper (e.g., 8½×11 size paper) so that the retailer does not need to purchase/utilize special paper.

Figure 3E:
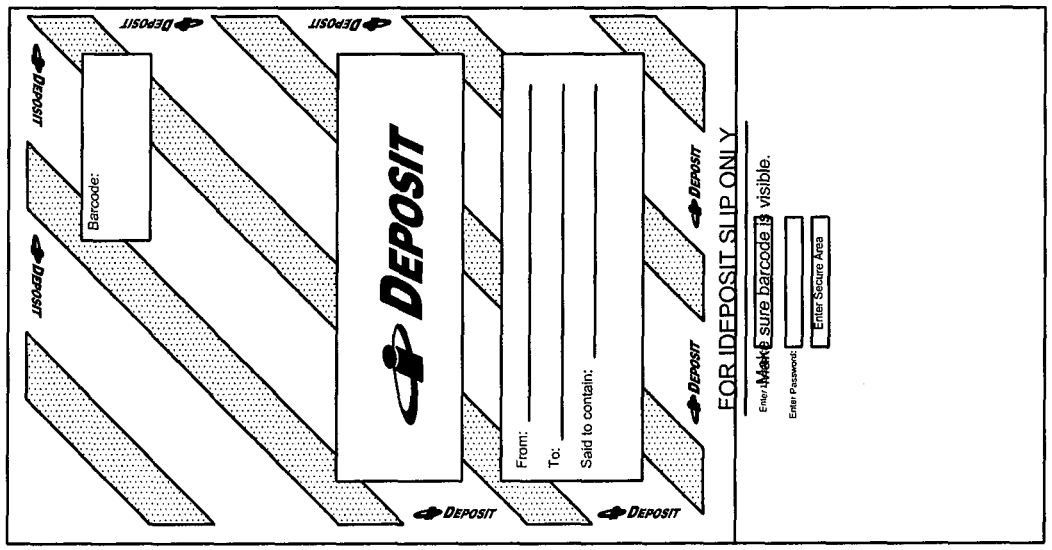
FIG. 3E is a schematic illustration of an exemplary deposit bag that may be employed with the present invention.

The manager places the printed deposit ticket with the cash to be deposited within, preferably, a tamper-evident deposit bag and seals it in preparation for pick-up, as shown as step 140 in FIG. 2. An exemplary tamper-evident deposit bag is shown in FIG. 3E. The deposit bag may include multiple compartments, and generally the deposit ticket is placed within one compartment and the cash is placed in a different compartment. In another variation, rather than employing a bag, a box or other type of container is employed. For purposes herein, the term "deposit bag" shall include any container or device into which cash may be contained.

Preferably, the barcode also is provided on the outside of the deposit bag to enable identification of the deposit bag's contents without referring to the deposit ticket disposed within the bag. In one convenient version, the sheet of paper on which the deposit ticket is printed includes a removable label onto which the barcode is printed, whereupon the manager simply removes the label (with the barcode printed thereon) and adheres it to the outside of the deposit bag. The code may be provided in a different format. In another version, barcodes (or other code format) are pre-printed on the deposit bags and the manager, prior to printing of the deposit ticket, is prompted to enter into the computer the alphanumeric code beneath the barcode on the deposit bag. Then, in such version, the deposit ticket that is printed and placed within the deposit bag contains the same barcode that is pre-printed on the deposit bag. Other manners of proving identification codes on the deposit ticket and/or the deposit bag may be employed.

As described above, a manager of retailer 10 utilizes a computer to access a secure website of process facilitator 50 to carry out the process shown in FIG. 2. By accessing a website to enter the information, no specialized software installed on the retailer's computer or specialized hardware is needed to implement such process. The cash collection deposit process of FIG. 2 also may be carried out without utilizing a computer. In accordance with another embodiment of the present invention, the retailer's manager initiates deposit creation by accessing a telephone VRU (voice response unit) of process facilitator 50 by dialing a designated telephone number and inputting via the telephone keypad the manager's user ID and password. The manager is voice prompted to enter in the deposit details by inputting, one at a time, deposit amounts by denomination. Preferably, the entered data is confirmed and a verbal indication is provided that indicates that a deposit ticket will be faxed to the pre-designated facsimile machine located at the retailer's facilities. Then, within a preset amount of time (e.g., 20 minutes), a copy of the deposit ticket containing the information identified above is automatically supplied to the designated facsimile machine. The manager retrieves the faxed deposit ticket and places it, along with the cash to be deposited, within the tamper-evident deposit bag and seals it in preparation for pick-up.

In yet a further variation of the deposit creation process described above, the deposit details are not manually provided by the retailer's manager but, instead, are provided electronically by a suitably designed electronic drop safe. Electronic drop safes having cash acceptors are known. For example, U.S. Pat. Nos. 5,695,038; 5,975,275; and 5,944,163 are directed to drop safes for receiving and temporarily storing currency from a point-of-sale terminal (e.g., a cash register). Bill acceptors within the drop safe accept and transfer cash into sealed cassettes within the safe, and a processor produces deposit reports that identify the contents of the sealed cassettes. U.S. Pat. Nos. 5,695,038; 5,975,275; and 5,944,163 are assigned to the assignee of the present invention and are incorporated herein by reference. In accordance with the present invention, an electronic drop safe can be modified with additional functionality so that the amounts of accumulated currency are transferred electronically, directly or indirectly, to process facilitator 50 (e.g., via its secure website). Such data can be supplied from the drop safe to a temporary electronic storage medium, preferably in encrypted form, that can be read by the computer during deposit creation. The data may be supplied directly, via a cable or wirelessly, from the electronic drop safe to the computer system prior to or during the deposit creation process. Then, the deposit details step is carried out by utilizing the data supplied by the electronic drop safe, rather than being manually entered by the retailer's manager. Transfer of electronic data from the electronic drop safe to process facilitator 50 may be carried out in other known manners. The deposit ticket then may be generated and printed in various manners. In one version, the manager accesses a secure website of process facilitator 50, such as described above, but the deposit details are not manually entered by the manager since that information already has been transmitted as described above. The manager simply initiates the generation and printing of the deposit ticket. In another version, software installed on the computer is designed to communicate with process facilitator 50 and then print the deposit ticket. In either variation, the deposit ticket is placed, along with the cash, in the tamper-evident deposit bag, and the deposit bag is sealed in the manner as already described.

Armored car service provider 20 (FIG. 1) picks up from retailer 10 the sealed tamper-evident deposit bag at preset periods of time (e.g., daily, twice daily, every other day, weekly, etc.) and transports the deposit bag to a cash vault for further processing. Alternatively, or in addition to pre-scheduled dates/times of pick-up, armored car service provider 20 is dispatched (e.g., by process facilitator 50) to conduct a pickup upon completion of the above-described deposit creation process carried out by retailer 10. In one version, completion and printing of the deposit ticket triggers the scheduling of a pickup. Although generally not preferred (due to the reduced or lack of security against theft), particularly for relatively large amounts of cash, the entity that picks up the sealed deposit bag may be a courier or message service (public or private) that does not employ armored cars. For purposes herein, armored car services, messenger services and courier services all generally refer to the entity that carries out the function of armored car service provider 20 as described herein.

Figure 4:
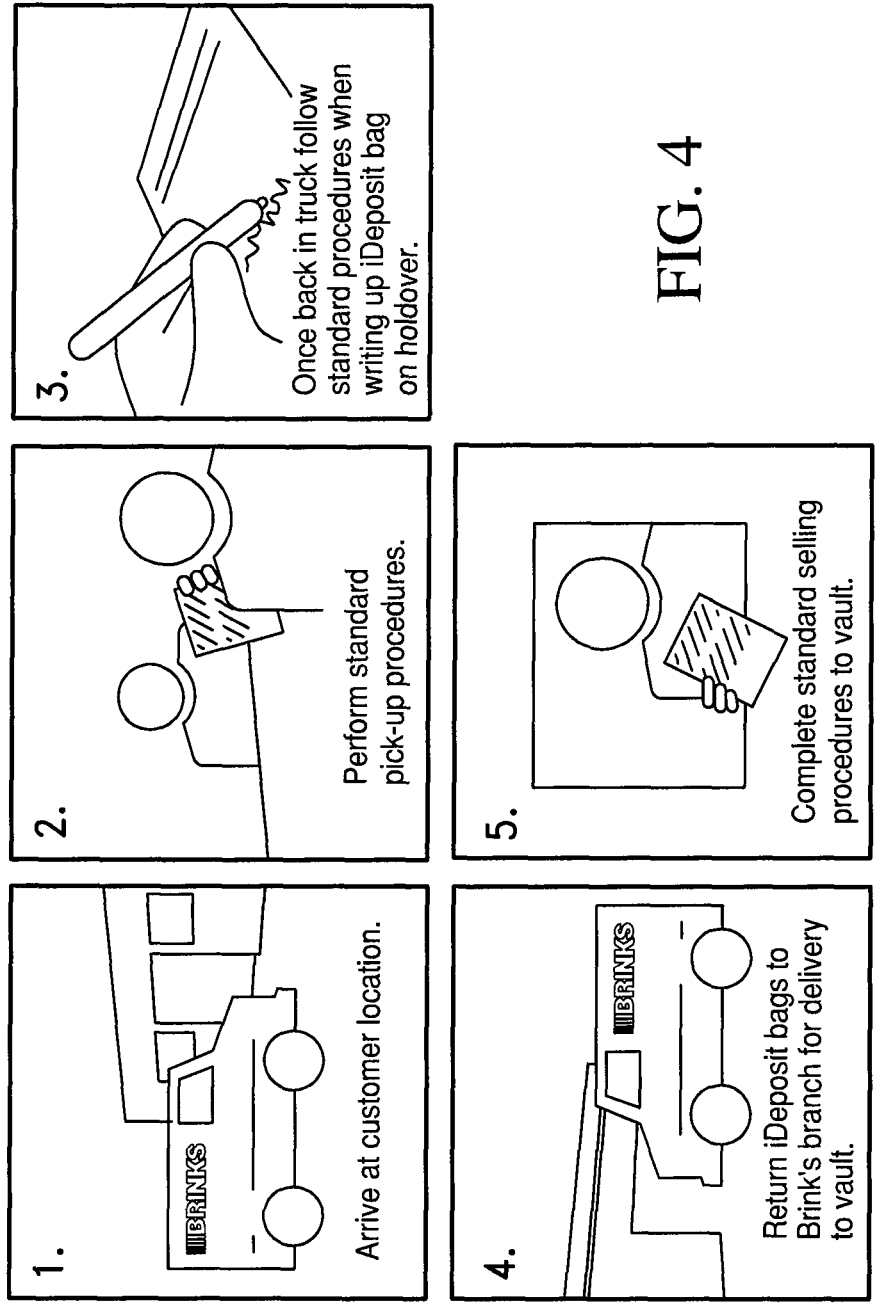
FIG. 4 is a diagram showing schematic illustrations of various operations that may be carried out by an armored car company in accordance with the present invention.

Preferably, the armored car service carries out the procedures shown in FIG. 4. In particular, the armored car service arrives at the retailer (box 1) and performs an industry standardized (or entity standardized) pick-up procedure (box 2). The armored car service then follows further standardized procedures when returning to the truck (box 3) and then drives the armored car to cash processing facility 30 (box 4). The armored car service then "sells" (i.e., supplies) each picked-up sealed deposit bag to cash processing facility 30 (box 5) for further handling. In addition, in a preferred version, the armored car service scans the barcode (using a barcode scanner) disposed on the outside of each deposit bag at pickup and also, optionally, upon supplying the deposit bags to cash processing facility 30 to facilitate proper tracking of the deposit bags, as will be further described. It is noted that the term "iDeposit," as well as the Brink's name and logo, as shown in FIG. 4 and in other figures, are trademarks of Brink's Network, Inc. the assignee of the present invention.

In accordance with the present invention, cash processing facility 30 carries out certain procedures during its handling of each sealed deposit bag. In particular, an authorized person at cash processing facility 30, who preferably is logged onto a secure website of process facilitator 50 by use of a unique User ID and password, identifies each sealed deposit bag by utilizing a barcode scanner that reads the barcode on the outside of the sealed deposit bag. Upon recognition of the unique barcode by the system, the status of the sealed deposit bag is designated "Received" (or other suitable designation) and the date and time of the status change is recorded.

As a particularly beneficial optional feature of the present invention, retailer 10 is provided with provisional credit in the amount of the reported deposit upon cash processing facility 30's receipt of a sealed deposit bag that originates from retailer 10. In one implementation of the provisional credit, cash processing facility 30 and bank 40 have a relationship that enables cash processing facility 30 to instruct bank 40 to credit retailer 10's bank account with an amount that corresponds to the amount reported by retailer 10 (i.e., during step 110 of FIG. 2).

In another variation of the present invention, the provisional credit is applied upon cash processing facility 30's verification of the amount of cash within the sealed deposit bag. In a further variation, the provisional credit is applied when the armored car service provider 20 picks-up the sealed deposit bag (e.g., the status of the sealed deposit bag is designated "Picked Up" (or other suitable status name, at this time). In yet an additional variation, the provisional credit is applied upon retailer 10's completion of the deposit creation steps discussed in connection with FIG. 2. In particular, in such variation, retailer 10 is provisionally credited with a total deposit based on the deposit details entered by retailer 10's manager during step 110 shown in FIG. 2. In any event, the provisional credit of the present invention enables the retailer to receive the benefit of its deposits prior to the actual deposit of the cash within the banking facility. Such provisional or "advance credit" is described in further detailed in U.S. patent application Ser. No. 11/924,055, filed Oct. 25, 2007, the disclosure of which is incorporated herein by reference. U.S. patent application Ser. No. 11/924,055 is assigned to the assignee of the present invention.

After the sealed deposit bag is "received" by cash processing facility 30 and, optionally, after retailer 10 is provided with a provisional credit, cash processing facility 30 verifies the contents of the deposit bag (called, for convenience, "verification" herein). Such verification may occur at any time after receipt, but it need not occur on the same day that the sealed deposit bag is received. For example, verification may occur on the next business (or calendar) day or even on a future date. In any event, verification entails identifying the deposit bag by scanning the barcode on the outside of the deposit bag, opening the deposit bag, removing the deposit ticket and the cash contained within the deposit bag, scanning the deposit ticket's barcode, automatically retrieving the deposit detail information previously supplied by the manager of retailer 10 using the scanned code or codes (if different) (i.e., by accessing information previously stored in a database), counting the cash, and finally comparing the counted amount of cash to the previously supplied information to verify that the current count coincides with such previously supplied information.

As described herein, each sealed deposit bag prior to verification and also during verification is identified by the use of bar-code technology, which includes use of a bar-code on each deposit bag, the deposit ticket therein and suitable bar-code reader equipment. However, other identification technology may be employed, including RFID technology in which each deposit bag contains an RFID chip containing a unique ID (preferably embedded within the deposit bag itself), and suitable RFID readers disposed at the retailer and the cash processing facility and optionally by the armored car service provider. Other identification technologies may be employed, including magnetic strips or other known techniques. As used herein, all references to barcode, barcode readers, etc., shall include all suitable identification technology.

When the barcode is read at cash processing facility 30, both upon receipt of the sealed deposit bag and during verification, as mentioned above, all information pertinent to the identity of retailer 10, which is pre-stored in a database, including relevant banking information (e.g., the bank account of retailer 10) and all information pertinent to the contents of the deposit bag itself are immediately made available to cash processing facility 30. During verification, if cash processing facility 30 discovers an overage or shortage in the amount of cash contained in the deposit bag as compared to the deposit amount as reported by retailer 10, such overage/shortage is communicated to bank 40 to correct the amount of any provisional credit that may already have been provided to retailer 10. Historically useful information pertinent to the overage/shortage is stored in a database, including at least the amount of the overage/shortage, the total amount of the deposit, the date and time, and the identity of the manager who created the deposit.

Finally, after cash processing facility verifies the contents of the deposit bag, the cash is transferred to bank 40 and retailer 10's bank account is credited with the deposit amount. Alternatively, the cash is deposited to another financial institute that, in turn, provides bank 40 with an appropriate credit (e.g., wire transfer) or provides retailer 50 with such appropriate credit. Since wire transfers and account reconciliation are well known and the operations/systems designed to carry out such processes are well known, further description thereof is not provided herein except where necessary for an understanding of the present invention.

In accordance with a further feature of the present invention, retailer 10 additionally may access the system/database of process facilitator 50 to track its own deposits, to produce reports, to view historical information including exceptions and variances, and to receive statistical information including total expected daily deposits. Managers of retailer 10 who are authorized to create a deposit may or may not be provided with authority to obtain any or all of such additional information. Personnel of retailer 10 can selectively be authorized to have limited or unlimited access to all of the data/reports available from process facilitator 50.

In the case of when retailer 10 has multiple locations, all of the above-identified data and reports are available on a store-by-store basis and also on an entity-wide basis so that a manager or employee disposed at one location (or in a corporate office or other facility) has (if authorized) immediate access to all deposits of all stores, independent of store location. Moreover, deposit report data and reports that incorporate such data, on a store-by-store basis and also on an entity-wide basis for all stores (or for a select group of stores), are available immediately upon deposit creation (i.e., completion of the deposit creation process, such as when the deposit ticket is printed), regardless of whether the cash of that deposit has been picked up from the retailer's store, delivered to the cash processing facility, verified by the cash processing facility, or delivered to a bank or other financial institute. Hence, reports may be generated that reflect cash collections at a retailer's multiple stores independent of the subsequent handling and actual location of such cash collections. These and other types of reports may include detailed tracking status information pertaining to all cash collections of all of a retailer's stores. With such information readily available to a retailer, cash collection activity, including volume of cash collections, schedules of cash processing (e.g., pickup, verification, etc.) and other characteristics, are ascertainable (using known data processing software, algorithms, statistical handling methodologies, etc.) and usable by a retailer to, among other things, ascertain problematic areas (e.g., individual store locations, pickup schedules, etc.) that need improvement.

In accordance with the present invention, process facilitator 50 may further provide status update information automatically to designated personnel of retailer 10 (e.g., via e-mail, upon log-in onto the secure website of process facilitator 50). Status update information may include the occurrence of a new deposit creation at a retailer location, a recent pickup, recent verification, etc., along with relevant data about that recent activity. For example, for a new deposit creation, information provided may include the total amount of the deposit, the location of the deposit creation (e.g., the store location), the identify of the deposit creator, the date and time of the deposit creation, historical data concerning that store location, etc.

Features and Benefits to Retailer

As described herein, the present invention entails various processes that facilitate novel cash collections deposits as well as deposit tracking. Retailers may take advantage of such processes without the need to purchase, install or otherwise utilize specialized hardware or software. There also is no need for the retailers to designate a specific computer for the deposit transactions. Generic Internet-enabled computers may be utilized by, as described above, accessing a website for entry of cash collections. Deposits may also be created even without the use of a computer.

Managers can view deposits and anticipated balances so they can make informed treasury decisions and better manage cash flow. Managers can track deposit activity in various manners, view exceptions and variances, and produce reports for trend analysis and/or to analyze activity by date range and/or by deposit status. Retailers are provided with desired status updates.

Retailers also reduce expenses previously incurred with traditional deposit activity. In particular, the present invention beneficially obviates the need for retailers to purchase deposit slips, and the time to commence a deposit is reduced. Fees associated with multiple deposits across multiple stores of a retailer optionally may be consolidated into a single, consolidated deposit.

Retailers benefit from accelerated funds availability. In various versions described herein, retailers are provided with credit before the cash reaches the bank, and in some variations on the same day that the deposit is created, Accelerated funds availability enables retailers the flexibility to make informed treasury decisions and to better manage cash flow. In some variations, funds become available regardless of cash vault cut-off windows.

Retailers benefit from increased efficiencies. The inventive process takes advantage of technology to expand the deposit window, giving retailers more time to transmit deposits according to a retailer's needs, not according to the bank's cut-off or the armored pick-up schedule.

Retailers benefit from increased accuracy. The inventive process provides for significantly less opportunity, as compared to existing processes, for re-keying and posting errors. Auto calculating fields allow for quick and accurate totaling that can be reviewed instantly for verification and compliance. In one version, deposit amounts are completely provided electronically thus eliminating errors in monetary amounts caused by human entry.

Retailers enjoy increased security. Intentional errors, such as misstatements in the deposit slips, are nearly eliminated. Access to the information is password-restricted, and the use of a layered approach to security allows managers to grant store employees with access to as much or as little as necessary.

Features and Benefit to Banks

Banks employing the present invention enjoy expanded reach. The system/process enables banks to leverage nationwide footprint and technology to facilitate retailer deposits.

Banks benefit from the added deposits with minimal risk. The third party processor (the process facilitator) optionally handles and coordinates the entire process, from pickup to verification, for low risk of error and increased security.

Banks can offer enhanced service. As being a part of the inventive process, banks can offer retailers streamlined account management, lower costs, and accelerated credit.

Having described the present invention including various features and variations thereof, it is intended that the appended claims be interpreted as including the embodiments described herein, the alternatives mentioned above, and all equivalents thereto.

What is claimed is:

1. A process of facilitating cash collection deposits, comprising the steps of:
    receiving from a retailer an identified amount of cash collected by the retailer, the identified amount including respective amounts of currency by denomination of the collected cash;
    creating at the retailer a deposit ticket, the deposit ticket having a unique identification code associated therewith, the unique identification code being associated with the identified amount of collected cash;
    arranging transport to a cash processing facility of a deposit bag containing the deposit ticket and the collected cash;
    ascertaining the identified amount of collected cash associated with the unique identification code associated with the deposit ticket contained in the transported deposit bag;
    counting, at the cash processing facility, the collected cash contained in the transported deposit bag to produce a counted amount of cash;
    verifying, by the cash processing facility, that the ascertained identified amount of collected cash corresponds to the counted amount of collected cash; and
    arranging, by the cash processing facility, for the retailer to be provided, when the deposit ticket is created, with a credit by a financial institute in an amount corresponding to the amount of the collected cash.

2. The process of claim 1, comprising depositing the counted collected cash into the financial institute.

3. The process of claim 1, wherein the step of receiving from a retailer comprises receiving by an electronic device via a manual entry by a user of the electronic device the respective amounts of currency by denomination of the collected cash; and transmitting from the electronic device to the cash processing facility data corresponding to information manually entered into the electronic device.

4. The process of claim 1, wherein receiving from a retailer comprises receiving via manual entry in a predetermined webpage of the cash processing facility the respective amounts of currency by denomination of the collected cash.

5. The process of claim 1, wherein the identified amount includes amounts of at least $100 bills, $50 bills and $20 bills of the collected cash.

6. The process of claim 1, wherein the step of creating at the retailer a deposit ticket comprises printing the deposit ticket on a standard size piece of paper.

7. The process of claim 1, wherein the step of receiving from a retailer comprises receiving via a telephone connection manual entry of the respective amounts of currency by denomination of the collected cash; and the step of creating at the retailer comprises sending, after receiving manual entry of the respective amounts of currency by denomination of the collected cash, a facsimile communication corresponding to the deposit ticket to the retailer and providing a printout at the retailer of the deposit ticket in accordance with the facsimile communication.

8. The process of claim 1, wherein the step of creating at the retailer a deposit ticket comprises including on the deposit ticket a bar code representing the unique identification code.

9. The process of claim 1, wherein the step of creating at the retailer a deposit ticket comprises including on the deposit ticket the respective amounts of currency by denomination of the collected cash.

10. The process of claim 1, wherein the deposit bag is a tamper-evident type bag.

11. The process of claim 1, wherein the deposit bag includes an RFID chip that uniquely identifies the deposit bag.

12. The process of claim 1, comprising automatically scheduling a pickup of the deposit bag from the retailer in accordance with a time when the deposit ticket is created.

13. The process of claim 1, comprising tracking a status of the deposit bag, the status of the deposit bag being a function of at least a location of the deposit bag and whether the verifying step has been carried out for the respective deposit bag.

14. The process of claim 1, wherein the cash processing facility is an entity distinct from the financial institute, the process further comprising the step of communicating, by the cash processing facility to the financial institute, information regarding either an overage or shortage in the collected cash counted by the cash processing facility to enable the financial institute to correct the amount of the credit provided by the financial institute to the retailer.

15. A process of facilitating cash collection deposits, comprising the steps of:
    receiving by an electronic safe disposed at a location of a retailer cash collected by the retailer;
    identifying by the electronic safe an amount of the collected cash, the identified amount including respective amounts of currency by denomination of the collected cash;
    creating at the retailer a deposit ticket, the deposit ticket having a unique identification code associated therewith, the unique identification code being associated with the identified amount of collected cash;
    arranging, by a cash processing facility, for the retailer to be provided with a credit by a financial institute when the deposit ticket is created in an amount corresponding to the amount of the collected cash;
    arranging transport to the cash processing facility of a deposit bag containing the deposit ticket and the collected cash;
    ascertaining the identified amount of collected cash associated with the unique identification code associated with the deposit ticket contained in the transported deposit bag;
    counting, at the cash processing facility, the collected cash contained in the transported deposit bag to produce a counted amount of cash; and verifying, by the cash processing facility, that the ascertained identified amount of collected cash corresponds to the counted amount of collected cash.

16. The process of claim 15, comprising automatically scheduling a pickup of the deposit bag from the retailer in accordance with a time when the deposit ticket is created.

17. The process of claim 15, comprising tracking a status of the deposit bag, the status of the deposit bag being a function of a location of the deposit bag and whether the verifying step has been carried out for the respective deposit bag.

18. The process of claim 15, comprising communicating from the electronic safe to the cash processing facility the amount of the collected cash; and wherein the step of creating at the retailer a deposit ticket includes accessing a predetermined webpage of the cash processing facility by the retailer using a computer disposed at the retailer and printing the deposit ticket in response to a print command on the computer while accessing the predetermined webpage, the deposit ticket being printed at the retailer.

19. A process of facilitating cash collection deposits at a plurality of stores of a retailer, comprising the steps of:
    receiving, at each of the stores of the retailer, from a manager at the respective store an identified amount of cash collected at the respective store, the identified amount including respective amounts of currency by denomination of the collected cash;
    creating, at each of the stores of the retailer, a deposit ticket having a unique identification code associated therewith, the unique identification code being associated with the identified amount of collected cash at the respective store;
    arranging, by the cash processing facility, for the retailer to be provided with a credit by a financial institute in an amount corresponding to each of the amounts of the collected cash, the credit being carried out for a respective amount of collected cash when one of the deposit tickets is created for a respective store of the retailer;
    arranging transport of each of a plurality of deposit bags to a cash processing facility, each of the deposit bags containing the respective deposit ticket and the respective collected cash;
    ascertaining, for each of the transported deposit bags, the respective identified amount of collected cash associated with the unique identification code associated with the respective deposit ticket contained in the respective transported deposit bag;
    counting, at the cash processing facility, the collected cash contained in each of the transported deposit bags to produce respective counted amounts of cash; and
    verifying, by the cash processing facility, that each of the ascertained identified amounts of collected cash correspond to the respective counted amount of collected cash.

20. The process of claim 19, comprising providing the retailer with a credit corresponding to a total of all of the amounts of the collected cash of all of the stores of the retailer.

21. The process of claim 19, comprising tracking statuses of all of the deposit bags, a status of a respective deposit bag being at least a function of a location of the deposit bag.

22. The process of claim 21, wherein the status of each of the deposit bags includes identifying if a deposit ticket was created for the respective deposit bag but the respective deposit bag is still located at the respective store of the retailer.

23. The process of claim 21, wherein the status of each of the deposit bags also is a function of whether the verifying step has been carried out for the respective deposit bag.

24. The process of claim 19, wherein the receiving step comprises receiving via manual entry in a predetermined webpage of the cash processing facility the respective amounts of cash collected at each of the stores.

25. The process of claim 24, wherein both the receiving and creating steps are carried out on respective electronic devices disposed at the stores without specialized software installed on the respective electronic devices designed to implement the receiving and creating steps.

26. A system for facilitating cash collection deposits, comprising:
    an electronic device disposed at a retailer location for receiving from a retailer an amount of cash collected by the retailer, the electronic device creating a deposit ticket having a unique identification code associated therewith, the unique identification code being associated with the amount of collected cash;
    a deposit bag for receiving the deposit ticket and the collected cash; and
    a cash processing facility for receiving the deposit bag and for ascertaining the amount of collected cash associated with the unique identification code associated with the deposit ticket contained in the deposit bag, the cash processing facility counting the collected cash contained in the deposit bag to produce a counted amount of cash, verifying that the ascertained amount of collected cash corresponds to the counted amount of collected cash, and arranging for the retailer to be provided with a credit by a financial institute when the deposit ticket is created in an amount corresponding to the amount of the collected cash.

27. A system for facilitating cash collection deposits, comprising:
    an electronic safe disposed at a retailer location for receiving cash collected by the retailer, the electronic safe identifying an amount of the collected cash, the identified amount including respective amounts of currency by denomination of the collected cash;
    an electronic device disposed at a retailer location for receiving information identifying the amount of cash received by the electronic safe, the electronic device creating a deposit ticket having a unique identification code associated therewith, the unique identification code being associated with the identified amount of collected cash;
    a deposit bag for receiving the deposit ticket and the collected cash; and
    a cash processing facility for receiving the deposit bag and for ascertaining the identified amount of collected cash associated with the unique identification code associated with the deposit ticket contained in the deposit bag, the cash processing facility counting the collected cash contained in the deposit bag to produce a counted amount of cash, and verifying that the ascertained identified amount of collected cash corresponds to the counted amount of collected cash, the cash processing facility arranging for the retailer to be provided with a credit by a financial institute when the deposit ticket is created by the electronic device in an amount corresponding to the amount of the collected cash.

28. A system for facilitating cash collection deposits at a plurality of stores of a retailer, comprising:
    a plurality of electronic devices, each of the electronic devices disposed at a respective one of the plurality of stores of the retailer, each of the electronic devices receiving from the respective retailer a respective amount of cash collected by the respective retailer and creating a respective deposit ticket having a unique identification code associated therewith and being associated with the respective amount of collected cash;

a plurality of deposit bags, each of the deposit bags receiving a respective deposit ticket and the collected cash collected by a respective one of the stores of the retailer; and a cash processing facility for receiving the deposit bags and for ascertaining, for each of the deposit bags, the respective identified amount of collected cash associated with the unique identification code associated with the respective deposit ticket contained in the respective deposit bag, the cash processing facility counting the respective collected cash contained in the respective deposit bag to produce a respective counted amount of cash, and verifying that the respective ascertained identified amount of collected cash corresponds to the respective counted amount of collected cash; the cash processing facility arranging for the retailer to be provided with a credit for a respective amount of collected cash when one of the deposit tickets is created for a respective store of the retailer.

29. A process of facilitating cash collection deposits, comprising the steps of:

receiving from a retailer, via manual entry by a user of an electronic device, an amount of cash collected by the retailer including respective amounts of currency by denomination of the collected cash;

transmitting, from the electronic device to a cash processing facility, data identifying the amount of cash collected by the retailer as manually entered into the electronic device;

creating at the retailer a deposit ticket, the deposit ticket having a unique identification code associated therewith, the unique identification code being associated with the identified amount of collected cash;

arranging transport to the cash processing facility of a deposit bag containing the collected cash along with the deposit ticket;

ascertaining the identified amount of collected cash associated with the unique identification code associated with the deposit ticket transported with the deposit bag;

counting, at the cash processing facility, the collected cash contained in the transported deposit bag to produce a counted amount of cash;

verifying, by the cash processing facility, that the ascertained identified amount of collected cash corresponds to the counted amount of collected cash; and arranging, by the cash processing facility, for the retailer to be provided, when the deposit ticket is created, with a credit by a financial institute in an amount corresponding to the amount of the collected cash.

30. The process of claim 29, wherein the step of arranging for the retailer to be provided with a credit comprises arranging, by the cash processing facility, for the retailer to be provided with the credit in accordance with a time the deposit ticket is created and in an amount based on the identified amount of collected cash as identified in the data transmitted from the electronic device to the cash processing facility.

31. A process of facilitating cash collection deposits, comprising the steps of:

receiving from a retailer, via manual entry in a predetermined webpage of a cash processing facility, an amount of cash collected by the retailer including respective amounts of currency by denomination of the collected cash;

creating, while the retailer is accessing the predetermined webpage, a deposit ticket at the retailer, the deposit ticket having a unique identification code associated therewith, the unique identification code being associated with the amount of collected cash corresponding to the manual entry by the retailer in the predetermined webpage;

arranging transport to the cash processing facility of a deposit bag containing the collected cash along with the deposit ticket;

ascertaining the identified amount of collected cash associated with the unique identification code associated with the deposit ticket transported with the deposit bag;

counting, at the cash processing facility, the collected cash contained in the transported deposit bag to produce a counted amount of cash;

verifying, by the cash processing facility, that the ascertained identified amount of collected cash corresponds to the counted amount of collected cash; and arranging, by the cash processing facility, for the retailer to be provided, when the deposit ticket is created, with a credit by a financial institute in an amount corresponding to the amount of the collected cash.

32. The process of claim 31, wherein the step of arranging for the retailer to be provided with a credit comprises arranging, by the cash processing facility, for the retailer to be provided with the credit in accordance with a time the deposit ticket is created and in an amount based on information manually entered by the retailer in the predetermined webpage.

33. A process of facilitating cash collection deposits, comprising the steps of:

receiving from a retailer, via manual entry during a telephone communication between the retailer and a cash processing facility, an amount of cash collected by the retailer including respective amounts of currency by denomination of the collected cash;

sending a facsimile communication to the retailer in response to the telephone communication between the retailer and the cash processing facility, the facsimile communication causing a deposit ticket to be printed at the retailer, the deposit ticket having a unique identification code associated therewith, the unique identification code being associated with the amount of collected cash corresponding to the manual entry of information made during the telephone communication between the retailer and the cash processing facility;

arranging transport to the cash processing facility of a deposit bag containing the collected cash along with the deposit ticket;

ascertaining the identified amount of collected cash associated with the unique identification code associated with the deposit ticket transported with the deposit bag;

counting, at the cash processing facility, the collected cash contained in the transported deposit bag to produce a counted amount of cash;

verifying, by the cash processing facility, that the ascertained identified amount of collected cash corresponds to the counted amount of collected cash; and arranging, by the cash processing facility, for the retailer to be provided, when the deposit ticket is created, with a credit by a financial institute in an amount corresponding to the amount of the collected cash.

34. The process of claim 33, wherein the step of arranging for the retailer to be provided with a credit comprises arranging, by the cash processing facility, for the retailer to be provided with the credit in accordance with a time the deposit ticket is printed and in an amount based on the manually entered information made during the telephone communication between the retailer and the cash processing facility.

35. A process of facilitating cash collection deposits, comprising the steps of:
- receiving from a retailer an amount of cash collected by the retailer including respective amounts of currency by denomination of the collected cash;
- creating at the retailer a deposit ticket, the deposit ticket having a unique identification code associated therewith, the unique identification code being associated with the identified amount of collected cash;
- automatically scheduling a pickup from the retailer of a deposit bag containing the collected cash along with the deposit ticket in accordance with when the deposit ticket is created;
- arranging, in accordance with the scheduled pickup, transport to the cash processing facility of the deposit bag containing the collected cash along with the deposit ticket;
- ascertaining the identified amount of collected cash associated with the unique identification code associated with the deposit ticket transported with the deposit bag;
- counting, at the cash processing facility, the collected cash contained in the transported deposit bag to produce a counted amount of cash;
- verifying, by the cash processing facility, that the ascertained identified amount of collected cash corresponds to the counted amount of collected cash; and
- arranging, by the cash processing facility, for the retailer to be provided, when the deposit ticket is created, with a credit by a financial institute in an amount corresponding to the amount of the collected cash.

* * * * *